United States Patent [19]
Nagamori et al.

[11] Patent Number: 5,595,425
[45] Date of Patent: Jan. 21, 1997

[54] BRAKE PRESSURE CONTROL UNIT OF VEHICLE LOAD RESPONSIVE TYPE

[75] Inventors: Kiyonobu Nagamori, Kariya; Sigeki Yagami, Chiryu; Hideaki Mitubayashi, Toyota, all of Japan

[73] Assignee: Aisin Seiki Kabushiki Kaisha, Kariya, Japan

[21] Appl. No.: 427,595

[22] Filed: Apr. 24, 1995

[30] Foreign Application Priority Data

Apr. 25, 1994 [JP] Japan .................................. 6-107378
Apr. 14, 1995 [JP] Japan .................................. 7-112572

[51] Int. Cl.⁶ ........................................... B60T 8/18
[52] U.S. Cl. ........................................... 303/22.1; 188/195
[58] Field of Search .................. 303/22.1, 22.2, 303/22.5, 22.8, 22.6; 188/195, 349

[56] References Cited

U.S. PATENT DOCUMENTS 4,639,048  1/1987  Schopper et al. ............... 303/22.1
4,707,036  11/1987  Farr ............................... 188/195 X

FOREIGN PATENT DOCUMENTS 2-124350  5/1990  Japan .
6-493     1/1994  Japan .
6-494     1/1994  Japan .
2268988   1/1994  United Kingdom ............... 303/22.1
93/11006  6/1993  WIPO ............................ 303/22.1

Primary Examiner—Peter M. Poon
Attorney, Agent, or Firm—Burns, Doane, Swecker & Mathis, LLP

[57] ABSTRACT

A brake pressure control unit of vehicle load responsive type is disposed in a brake pressure line extending from a master cylinder to wheel brake cylinders and composed of a P-valve, a load-sensing lever abutting on a plunger of the P-valve, a secondary spring disposed between the bracket secured to the P-valve and the free end of the lever, and a primary spring disposed between the other free end of the lever and a lower end of a rod which is swingably held on the other free end of the lever. The brake pressure control unit is preassembled as one unit before it is installed in the vehicle as it is. The direction of the biasing force of the secondary spring is the same as that of the primary spring.

6 Claims, 4 Drawing Sheets

BRAKE PRESSURE CONTROL UNIT OF VEHICLE LOAD RESPONSIVE TYPE

BACKGROUND OF THE INVENTION

This invention relates to a brake pressure control unit for regulating a hydraulic brake pressure supplied from a master cylinder to at least one the wheel brake cylinders depending upon a load on the vehicle suspension.

In order to reduce the possibility of skidding in the rear wheels, it is necessary to have the hydraulic brake pressure at the rear brakes increase at a reduced rate with respect to front wheel brake pressure in accordance with the load of the vehicle. In view of safely driving, the hydraulic brake pressure from the master cylinder is distributed to the wheel brake cylinders in such a manner that the front wheel locking state occurs precedently rather than the rear wheel locking state. Refer to FIG. 4 wherein the mutual relationship of the hydraulic brake pressure within the front wheel cylinders and the rear wheel cylinders is shown, a brake pressure control unit is designed in practice to locate lines (A, A') for real braking effort below lines (B, B') for ideal braking effort, thereby establishing a tendency of the front wheel preceding locking state. However, since the lines (A, A') for real braking effort are linear and the lines (B, B') for ideal braking effort are a curve of secondary degree, respectively, the brake pressure control unit is provided with a load sensing proportional valve (so called P-valve) to form split or broken points (C, C') so as to bring the lines (A, A') close to the lines (B, B').

To obtain the afore-mentioned real braking effort lines, a conventional brake control unit is generally constructed in such a manner that the P-valve secured a vehicle's body (a chassis frame side) is arranged to be connected with the master cylinder and the rear wheel cylinders and a load sensing lever swingable about a pivot point abuts on a plunger of the P-valve, its free end being connected operatively to a bracket on the axis side by way of a coiled spring. In this construction, the dimensional relation between the chassis frame and the bracket on the axis side is varied depending upon the extent of the current load of the vehicle and this variation is transmitted to the load sensing lever so as to push the plunger of the P-valve to a corresponding extent to such the effect on the lever, so that the split points can be optimally selected on the real braking effort lines due to the variation of the change-over pressure point of the P-valve.

This type of a brake pressure control unit is known from the disclosure of U.S. Pat. No. 4,639,048 in which a lever abutting on a plunger of the P-valve is connected through a threaded spindle and a spring device with a bracket on the axis side. In this conventional unit, the spring device is equipped with a spacing element in the shape of a distance gauge to eliminate play of the lever with respect to the P-valve and select a distance between two positions of a spring pivot point, and the brake pressure control unit with the P-valve and the spacing element is installed in the unloaded vehicle. After mounting the brake pressure control unit and adjusting the freedom of play of the lever, the spacing element is removed from the spring device.

It is a disadvantage in the conventional brake control unit as afore-mentioned that the space element is essential to keep the biasing force of the spring constant and has to be removed from the spring device after mounting of such unit on the unloaded vehicle and adjustment of the freedom of play of the lever. This will increase labor costs and result in an increase of the costs of the whole brake pressure control unit.

SUMMARY OF THE INVENTION

It is, therefore, a primary object of the present invention to provide an improved brake pressure control unit of vehicle load responsive type which can solve problems in the conventional unit as described above.

Another object of the present invention is to provide a brake pressure control unit of vehicle load responsive type having a pair of springs and a load sensing lever which abuts on a plunger of a load-sensing proportional valve (so called P-valve) to vary a change-over pressure point thereof, with a biasing force of a first spring being exerted on one of the free ends of the lever and a biasing force of a second spring being exerted on another free end thereof. The direction of the biasing force of the first spring with respect to the plunger of the P-valve is the same as that of the second spring and the brake pressure control unit which is preassembled as one unit is installed in a vehicle as it is.

According to the invention, the above-mentioned object of the present invention can be attained by a brake pressure control unit of vehicle load responsive type comprising: a load-sensing proportional valve to be disposed in a hydraulic brake pressure line extending from a master cylinder to rear wheel brake cylinders, a load-sensing lever swingable about a pivotal point formed on a stationary member which is secured to the proportional valve and abutting on a plunger of the proportional valve, a secondary spring disposed between the stationary member and one of the free ends of the lever, a rod engaged with another free end of the lever, and a primary spring disposed between another free end of the lever and a lower portion of the rod, the direction of the biasing force of the secondary spring with respect to the plunger of the P-valve being the same as that of the primary spring, said brake pressure control unit being pre-assembled as one unit and installed in the vehicle as it is in such a manner that the proportional valve is secured to a bracket on a chassis frame side of the vehicle and the end of the rod is secured to a bracket on an axis side thereof.

According to the present invention, there is further provided a brake pressure control unit of a vehicle load responsive type comprising: a load-sensing proportional valve for supplying a hydraulic brake pressure to wheel brake cylinders, a bracket secured to the proportional valve, a lever swingable about a pivotal point formed on the bracket and abutting on a plunger of the proportional valve, a secondary spring disposed between the bracket and one of free ends of the lever, a retainer secured to the other free end of the lever, a rod which is pushed through an opening of the retainer and swingable about the retainer, a primary spring disposed between the retainer and one end of the rod, and a hook member secured to the other end of the rod, the direction of the biasing force of the secondary spring with respect to the plunger of the P-valve being the same as that of the primary spring, said brake pressure control unit being pre-assembled as one unit and installed in the vehicle as it is in such a manner that the proportional valve is secured to a bracket on a chassis frame side of the vehicle and the hook member is secured to a bracket on an axis side thereof.

The invention will now be further described with reference to the accompanying drawings which illustrate, by way of example, several embodiments of a brake pressure control unit in accordance with the invention.

DETAILED DESCRIPTION OF A PREFERRED EMBODIMENT

Figure 1:
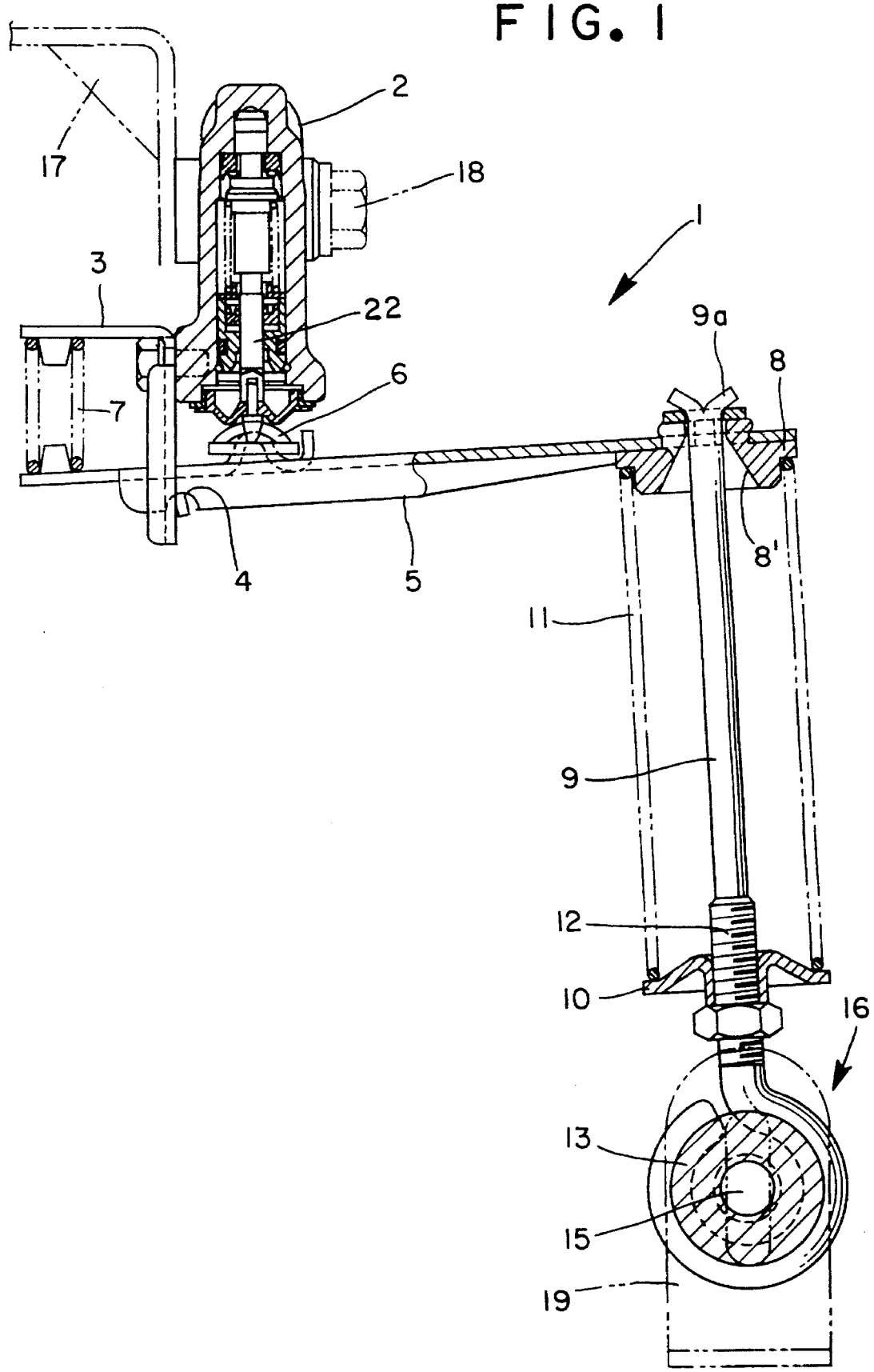
FIG. 1 is a view showing a brake pressure control unit of vehicle load responsive type according to the present invention.

The present invention will now be described in more detail by way of a preferred embodiment thereof in connection with FIG. 1. As shown in FIG. 1, a brake pressure control unit 1 of vehicle load responsive type includes a load-sensing proportional valve (refer to P-valve hereinafter) 2 to supply a brake pressure from a master cylinder (not shown) to front wheel brake cylinders (not shown) and rear wheel brake cylinders (not shown). This P-valve is of a conventional type and has a plunger or piston 22 and a bracket 3 in the shape of an L character. A load-sensing lever 5 extends horizontally by passing through an aperture 4 formed on the bracket 3. A contact point of the aperture 4 and the lever 5 serves as a pivotal point of the lever 5 which abuts on the plunger 22 via an equalizer 6. A secondary spring 7 is disposed between the bracket 3 and free end of the lever 5 to urge it downwardly about the pivotal point 4 and push the plunger 22 toward inside of the P-valve 2. The lever 5 is provided at its other free end with a retainer 8 having an opening 8' processing a conical shape through which a rod 9 is pushed.

The upper end of the rod 9 is engaged with the retainer 8 so that the rod 9 is swingable about the opening of the retainer with respect to the lever 5 because of the opening 8' of the retainer 8. The rod 9 is provided at its lower end with a threaded portion 12 and a seat 10 firmly secured to the threaded portion 12 with a nut. A distance between the retainer 8 and the seat 10 is adjustable by changing the position of the seat 10 with respect to the threaded portion 12.

A primary spring 11 is disposed between the retainer 8 and the seat 10. The biasing force of the primary spring 11 urges the rod 9 downwardly (in FIG. 1) and the length of the pre-loaded primary spring 11 can be adjusted by varying the distance between the retainer 8 and the seat 10, so that the lever 5 is free of play with respect to the retainer 8 and the equalizer 6. A device for securing a bent-over end of the rod 9 to a bracket 19 on the axis side is composed of a spacer 13 around which the bent-over end of the rod 9 is wound, a sleeve 14 with flanges and a bolt 15 passing through a central hole of the sleeve 14. The direction of the biasing force of the secondary spring with respect to the plunger of the P-valve is the same as that of the primary spring.

Figure 2:
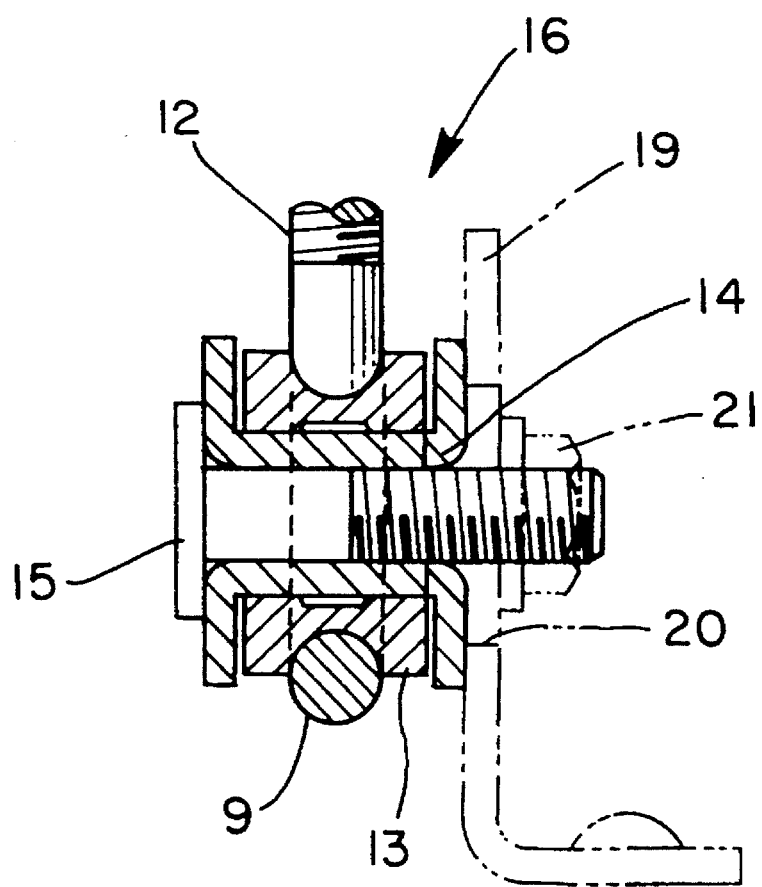
FIG. 2 is a cross-sectional view of a spacer mounted on one end of a rod shown in FIG. 1.

It should be noted that the brake control valve unit 1 of a vehicle load responsive type as illustrated in FIGS. 1 and 2 is pre-assembled as one unit before it is installed in the vehicle.

The P-valve 2 of the pre-assembled control unit is mounted fixedly on a chassis frame 17 of a vehicle by means of a bolt 18 and subsequently the bolt 15 of the rod securing device 16 is passed through an elongated hole 20 of the bracket 19 on the axis side of the unloaded vehicle to secure the rod 9 to the bracket 19 by means of a nut 21. The working hours for securing the brake control unit 1 in the vehicle is considerably reduced and the adjustment of the freedom of play of the lever 5 is eliminated after installation of the valve unit 1.

Figure 3:
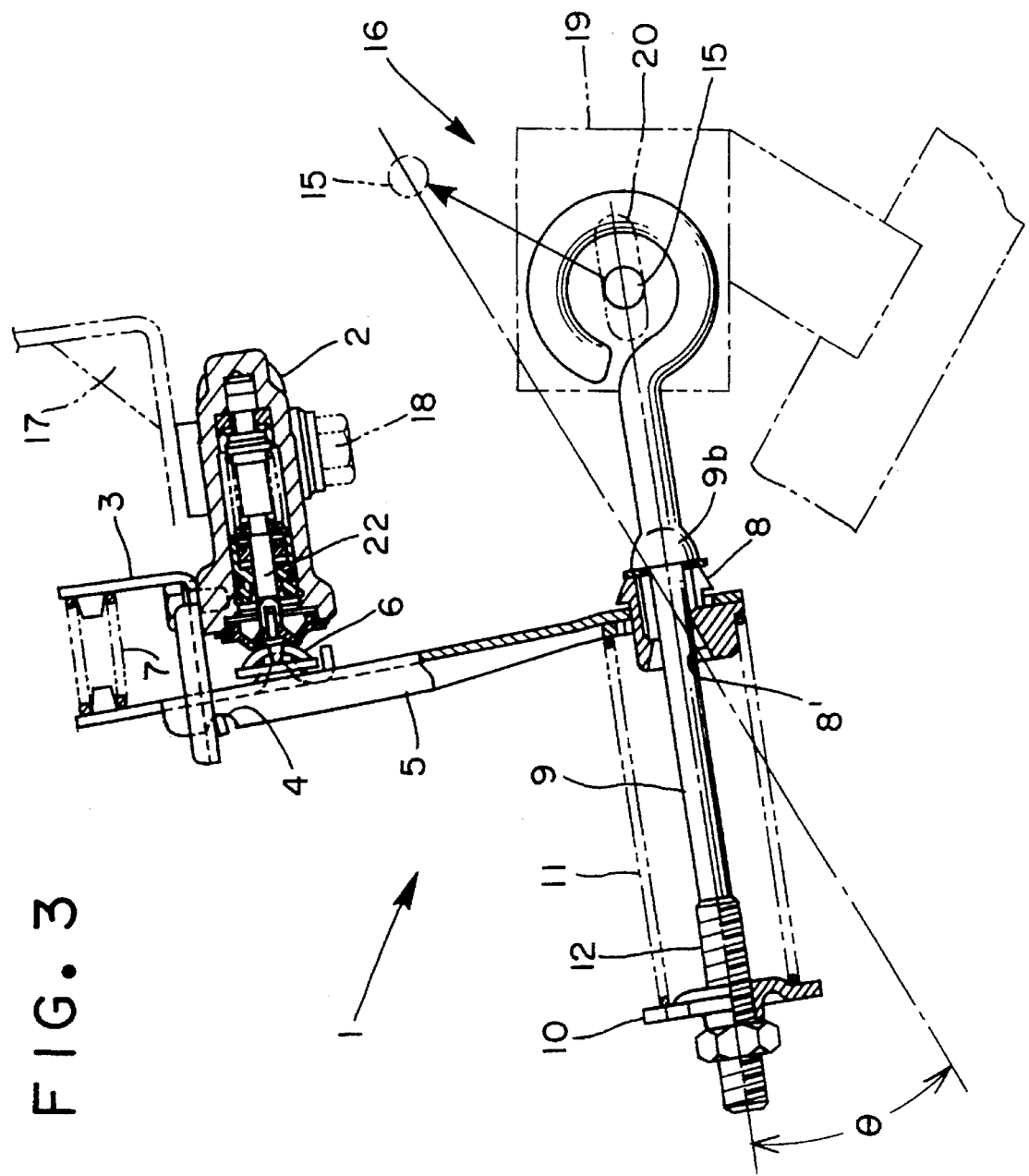
FIG. 3 is a view showing another embodiment of the present invention.

Another embodiment of the present invention is illustrated in FIG. 3, which corresponds in essence to the brake pressure control unit 1 according to FIG. 1. Thus, the detailed description of the general structure of FIG. 3 will be omitted by showing corresponding parts by the same reference characters.

In this case, the rod 9 is provided at its middle portion with an enlarged portion 9b which abuts on the retainer 8 and the primary spring 1 is disposed between the seat 10 and the retainer 8. It is noted that the seat 10 and the threaded portion 12 are provided on the free end side opposed to the bent-over end side of the rod 9. Thus, the primary spring 11 is positioned on the left side of the lever 5 and the rod securing device 16 is positioned on the right side of the lever 5 (in FIG. 3), so that the primary spring 11 urges the rod 9 leftwardly and the enlarged portion 9b of the rod 9 is brought into engagement with the retainer 8. The direction of the biasing force of the secondary spring with respect to the plunger of the P-valve is the same as that of the primary spring.

The brake pressure control unit 1 illustrated in FIG. 3 is pre-assembled as one unit before it is installed in the vehicle. The pre-assembled control unit 1 is subjected to adjustment of the freedom of play of the lever 5. The P-valve 2 of the pre-assembled control unit 1 is fixedly secured to the chassis frame 17 of the vehicle by means of the bolt 18 and the rod securing device 16 is also fixed on the bracket 19 on the axis side of the unloaded vehicle by means of the bolt 15 and the nut 21. 20 denotes the elongated hole formed on the bracket 19.

Figure 4:
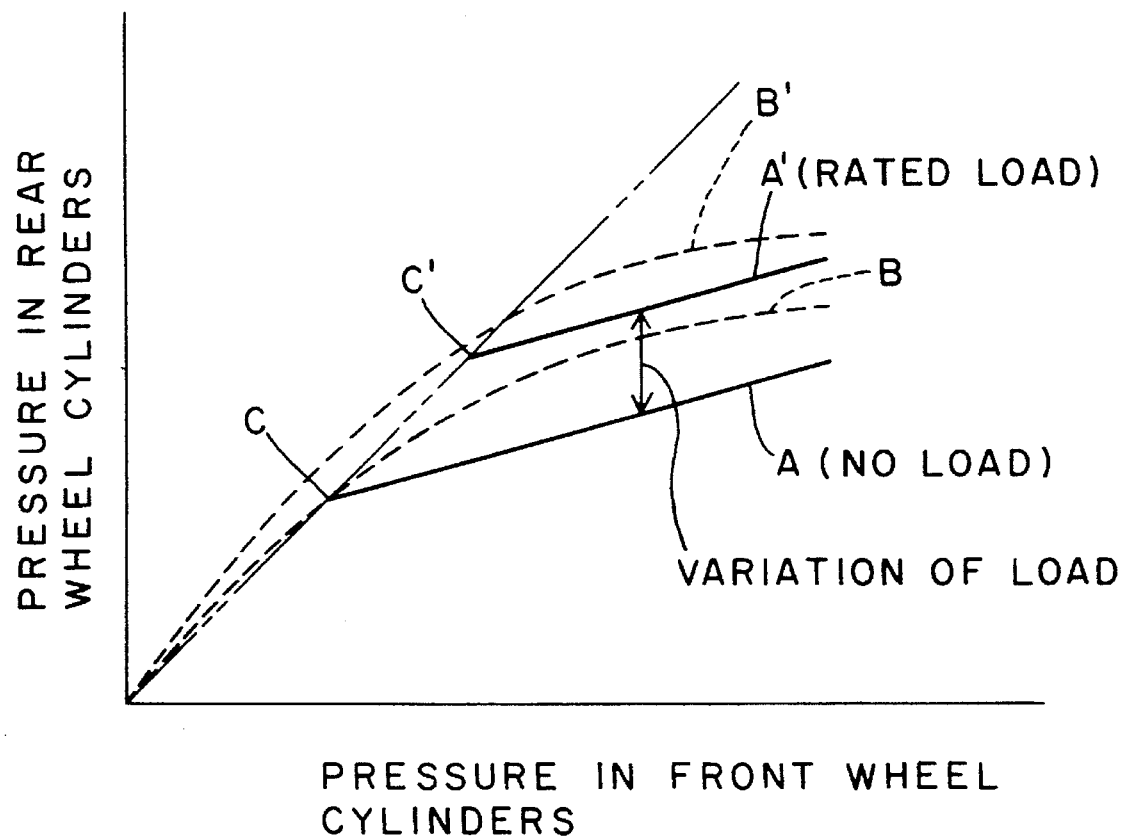
FIG. 4 is a graphic representation showing the mutual relationship between pressures in rear wheel and front wheel cylinders connected to a conventional brake pressure control unit.

The variation of the vehicle's load causes the position of the bolt 15 to be moved in the direction of an arrow and the rod 9 is arranged to be rotated through approximately θ (see FIG.3) about the retainer 8. The movement of the rod securing device 16 results in compression of the primary spring 11 and turning of the lever 5 in the counter-clockwise direction (in FIG. 3), so that the change-over pressure point of the P-valve 2 is adjusted in accordance with the current load of the vehicle and split points (C, C') in FIG. 4 are made.

According to the present invention, the control unit which is pre-assembled as one unit and of which primary spring is suspended free of play with respect to the P-valve can be installed in the vehicle as it is without removal of any parts from the control unit and adjustment of the length of the primary spring after installation of the control unit in the vehicle. Thus, the working hours for securing the control unit to the vehicle are considerably reduced.

Although the present invention has been illustrated and described in connection with a specific embodiment and certain modifications thereof are possible. The invention, therefore, is not intended to be restricted to the exact showing of the drawings and description thereof, but is considered to include reasonable and obvious equivalents.

What is claimed is:

1. A brake pressure control unit of vehicle load responsive type comprising: a load-sensing proportional valve to be disposed in a hydraulic brake pressure line extending from a master cylinder to at least one rear wheel brake cylinder, a load-sensing lever swingable about a pivot point formed on a stationary member which is secured to the proportional valve and abutting on a plunger of the proportional valve, a secondary spring disposed between the stationary member and one of the free ends of the lever, a rod engaged with the other free end of the lever, and a primary spring disposed between the other free end of the lever and a lower portion of the rod, the direction of the biasing force of the secondary spring with respect to the plunger of the proportional valve being the same as that of the primary spring, said brake pressure control unit being pre-assembled as one unit and installed in the vehicle as it is in such a manner that the proportional valve is secured to a bracket on a chassis frame side of the vehicle and the end of the rod is secured to a bracket on an axis side thereof.

2. A brake pressure control unit according to claim 1, wherein the lever is provided at one of its free ends with a retainer having an opening in the conical shape through which the rod is pushed, an upper end of the rod being engaged with the retainer in a swingable fashion.

3. A brake pressure control unit according to claim 2, wherein the rod is positioned at a center portion of the primary spring and secured to the bracket on the axis side by means of a bolt which passes through an elongated hole formed thereon.

4. A brake pressure control unit of vehicle load responsive type comprising: a load-sensing proportional valve for supplying a hydraulic brake pressure to at least one wheel brake cylinder, a bracket secured to the proportional valve, a lever swingable about a pivot point formed on the bracket and abutting on a plunger of the proportional valve, a secondary spring disposed between the bracket and one of the free ends of the lever, a retainer secured to the other free end of the lever, a rod which is pushed through an opening of the retainer and swingable about the retainer, a primary spring disposed between the retainer and one end of the rod, and a hook member secured to the other end of the rod, the direction of the biasing force of the secondary spring with respect to the plunger of the proportional valve being the same as that of the primary spring, said brake pressure control unit being pre-assembled as one unit and installed in the vehicle as it is in such a manner that the proportional valve is secured to a bracket on a chassis frame side of the vehicle and the hook member is secured to a bracket on an axis side thereof.

5. A brake pressure control unit according to claim 4, wherein an upward movement of the hook member in response to the variation of a load of the vehicle causes the rod to be turned about the opening of the retainer and the primary spring to be compressed so as to push the plunger of the proportional valve.

6. A brake pressure control unit according to claim 5, wherein the rod is provided at its middle portion with an enlarged portion which generally abuts on the retainer and the opening of the retainer is in the conical shape.

* * * * *